(12) United States Patent
Adam

(10) Patent No.: US 8,956,139 B2
(45) Date of Patent: *Feb. 17, 2015

(54) MOLD SYSTEM FOR FORMING MULTILEVEL BLOCKS

(71) Applicant: Paul Adam, Jefferson City, MO (US)

(72) Inventor: Paul Adam, Jefferson City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/318,048

(22) Filed: Jun. 27, 2014

(65) Prior Publication Data

US 2014/0308383 A1  Oct. 16, 2014

Related U.S. Application Data

(63) Continuation of application No. 13/742,968, filed on Jan. 16, 2013, now Pat. No. 8,794,956, and a continuation-in-part of application No. 13/136,275, filed on Jul. 27, 2011.

(51) Int. Cl.
B28B 3/08 (2006.01)
B28B 7/24 (2006.01)
B29C 43/34 (2006.01)
A01G 1/08 (2006.01)
B28B 3/06 (2006.01)

(52) U.S. Cl.
CPC . *B28B 3/083* (2013.01); *A01G 1/08* (2013.01); *B28B 3/06* (2013.01)

USPC ........... 425/338; 425/356; 425/413; 425/416; 425/430; 425/431; 425/434; 425/448; 425/452; 425/469; 249/119; 249/129

(58) Field of Classification Search
CPC .......... B28B 3/083; B28B 7/24; B28B 13/02; B29C 43/34; B29C 43/146; B44F 7/00; A01G 1/08; E01C 5/02
USPC ......... 425/338, 356, 412–414, 416, 425, 430, 425/431, 434, 447, 448, 451.9, 452, 469; 249/118–120, 129

See application file for complete search history.

(56) References Cited

U.S. PATENT DOCUMENTS

| 5,612,065 | A | * | 3/1997 | Keller | 425/356 |
|---|---|---|---|---|---|
| 5,939,104 | A | * | 8/1999 | Johnston | 425/356 |
| 8,794,956 | B2 | * | 8/2014 | Adam | 425/338 |
| 2006/0022112 | A1 | * | 2/2006 | Ishler | 249/77 |
| 2010/0007051 | A1 | * | 1/2010 | Ness et al. | 264/299 |

* cited by examiner

Primary Examiner — Dimple Bodawala
(74) Attorney, Agent, or Firm — David H. Chervitz

(57) ABSTRACT

A mold system for forming a multilevel block is disclosed which comprises a multilevel mold box insert for forming a multilevel block, a mold box frame adapted for receiving therein the multilevel mold box insert, a multilevel plunger assembly, and a press head plate adapted for receiving thereon the multilevel plunger assembly.

8 Claims, 21 Drawing Sheets

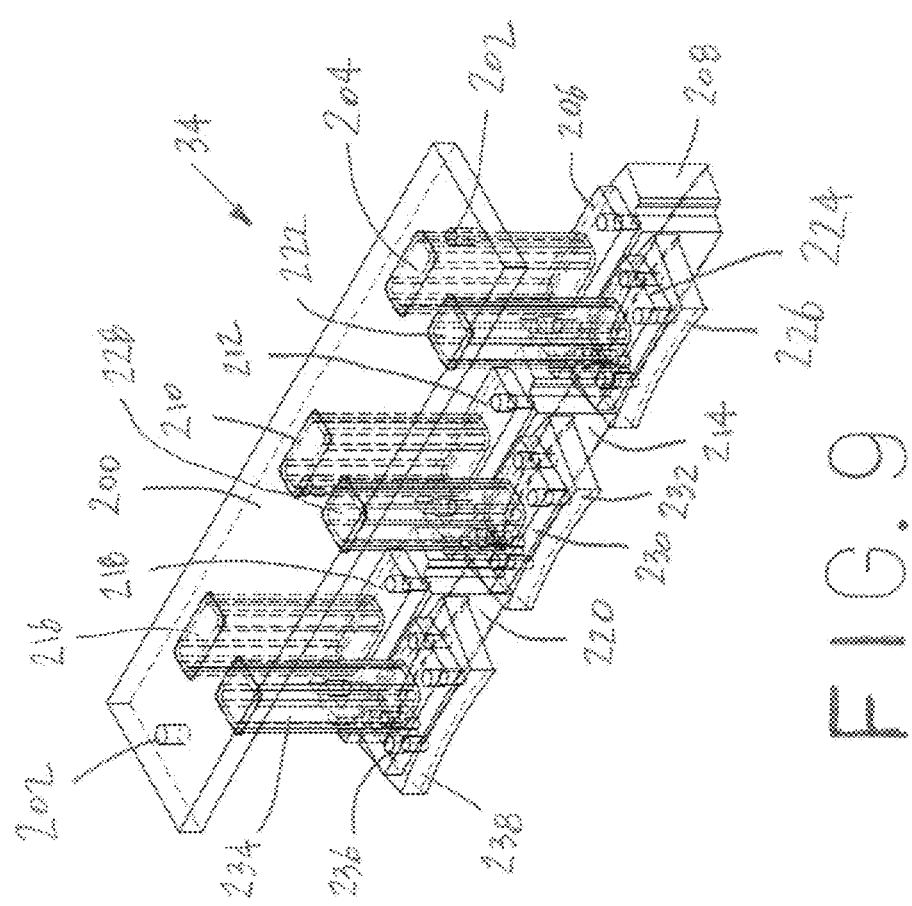

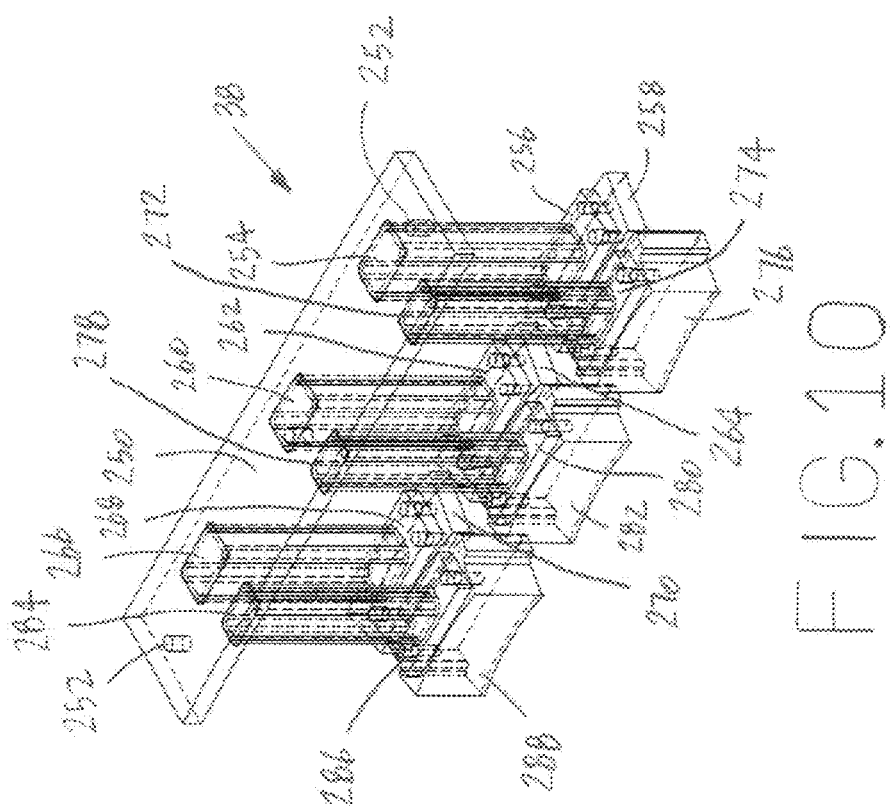

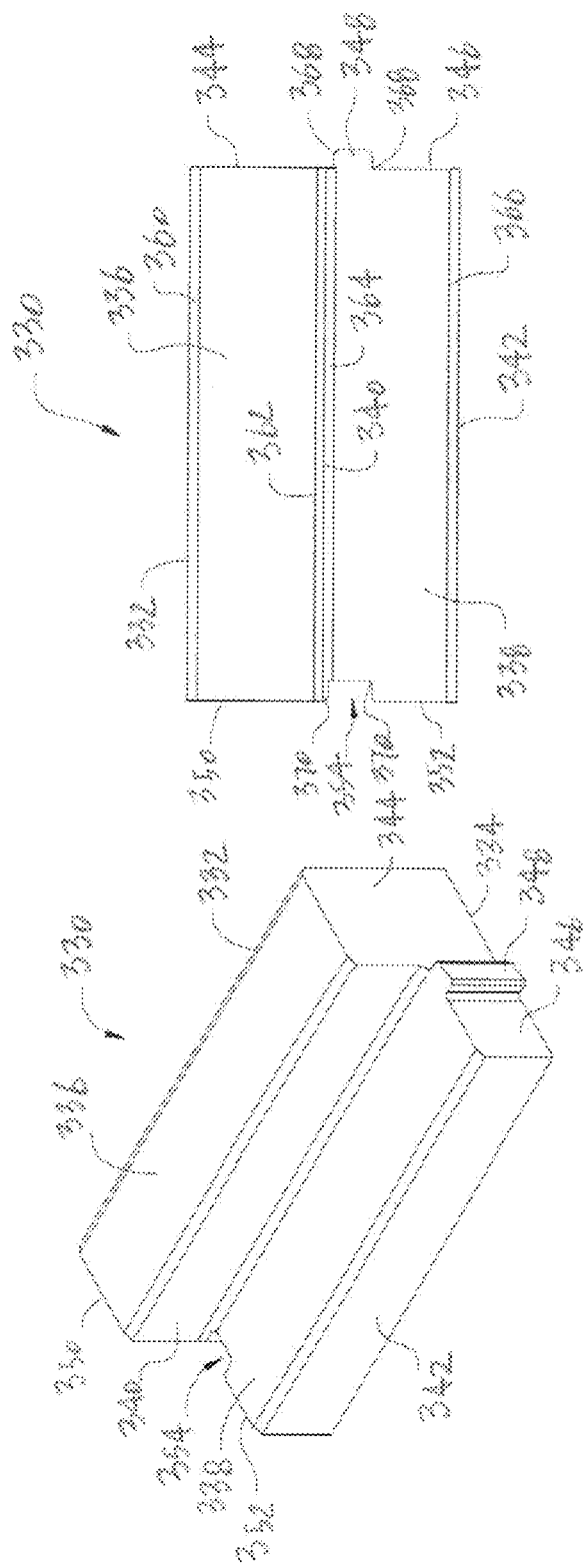

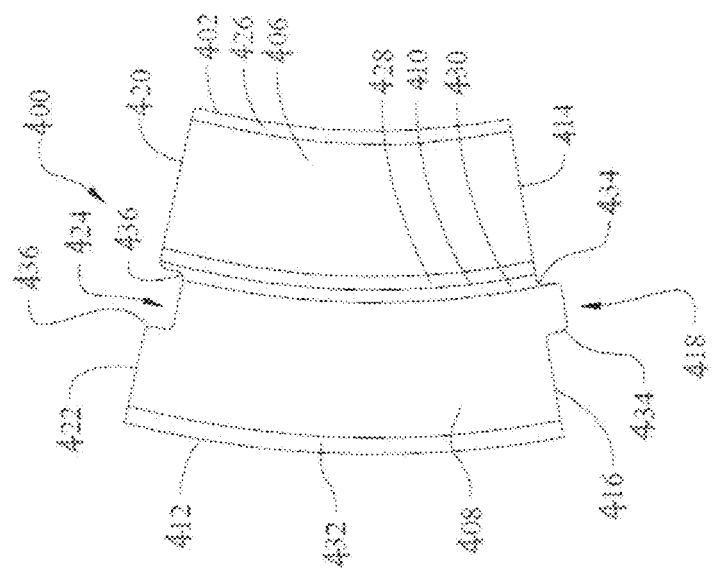

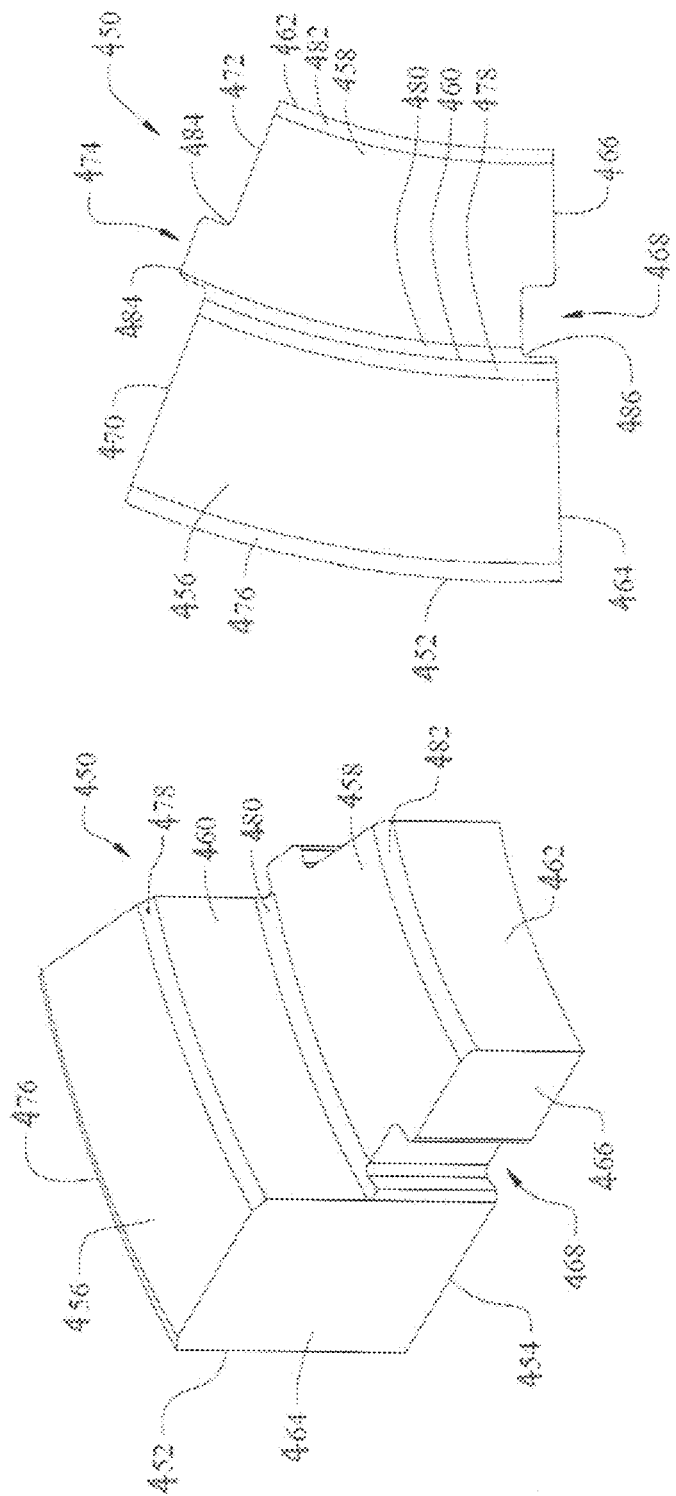

MOLD SYSTEM FOR FORMING MULTILEVEL BLOCKS

CROSS REFERENCE TO RELATED APPLICATIONS

This application is a continuation-in-part of U.S. patent application Ser. No. 13/136,275, which was filed on Jul. 27, 2011, and is a continuation of U.S. patent application Ser. No. 13/742,968, which was filed on Jan. 16, 2013, which is now U.S. Pat. No. 8,794,956.

BACKGROUND

This disclosure relates to a mold system and more particularly to a mold system for forming multiple tiered blocks such as an edging comprising a low edge surface upon which a lawn mower may ride or travel when cutting grass and a high edge surface for retaining landscape elements such as mulch or rock. Further, a multilevel mold system is disclosed that can be used in a block or paver machine to manufacture various shaped multilevel or multiple tiered blocks.

The landscaping of residential and commercial properties can include a lawn in combination with various other landscaping structures. For example, a grass lawn may encompass a majority of the landscaping with trees and a planting bed being interspersed in the grass lawn. In this case, a border may be formed between the grass lawn and the trees and the planting bed. The border may be constructed using various materials such as railroad ties, rocks, blocks, and plastic edging. Although such borders are decorative, they pose a problem when cutting the grass lawn. In particular, there is an edge between the grass lawn and the border which is difficult to cut by use of lawn mowing equipment and requires trimming of the edge so that the height of the grass in the edge is the same as the height of the grass in the lawn. Trimming is time consuming and requires additional equipment to trim the edge. Although there have been various edging systems proposed, such systems have disadvantages. For example, such systems are difficult for a homeowner to install and require a professional installation. A professional installation adds to the cost of the system. Also, some of the edging systems are expensive to manufacture which adds to the cost of installing the system. Another disadvantage is that the edging systems do not lock or hold the edging system in place. In view of this, such systems are subject to failure and need to be replaced or completely removed. Another disadvantage is that the edging systems do not allow for the construction of different shaped borders. In particular, only a few border configurations may be constructed. For example, some edging systems only provide for the installation of a rectangular shaped border. If a rounded border is desired then the edging system may not be used. Further, if an irregular shaped border, such as a kidney shaped border, is required then such edging systems are not capable of forming an irregular shaped border.

Although these landscape edging blocks are useful, such blocks are difficult to manufacture because they are multilevel blocks. Therefore, it would be desirable to have a mold system that is capable of manufacturing various shaped multilevel blocks that are versatile and adapted to form any shape or configuration required in a landscaped area. The mold system of the present disclosure is also capable of forming different shaped blocks during the same manufacturing process. It would also be advantageous to have a mold system that can manufacture multilevel blocks that can be locked in place and are easy to install by both professionals and homeowners. Moreover, the mold system of the present disclosure can be employed to produce multilevel blocks that can be easily used to construct various complex landscaping configurations with a small number of blocks comprising the landscape edging system.

BRIEF SUMMARY

In one form of the present disclosure, a mold system for forming a multilevel block comprises a multilevel mold box insert for forming a multilevel block, a mold box frame adapted for receiving therein the multilevel mold box insert, a multilevel plunger assembly, and a press head plate adapted for receiving thereon the multilevel plunger assembly.

In another form of the present disclosure, a mold system is for forming multilevel blocks is disclosed that comprises a number of multilevel mold box inserts each for forming a multilevel block, a mold box frame adapted for receiving therein the number of multilevel mold box inserts, a number of multilevel plunger assemblies for each of the multilevel mold box inserts, and a press head plate adapted for receiving thereon each of the multilevel plunger assemblies.

In yet another form of the present disclosure, a mold system for forming multilevel blocks is disclosed that comprises a first multilevel mold box insert for forming a multilevel block of a first configuration, a second multilevel mold box insert for forming a multilevel block of a second configuration, a mold box frame adapted for receiving therein the multilevel mold box inserts, a first multilevel plunger assembly associated with the first multilevel mold box insert, a second multilevel plunger assembly associated with the second multilevel mold box insert, and a press head plate adapted for receiving thereon the multilevel plunger assemblies.

The present disclosure also provides a mold system for forming multilevel blocks that is easy to use to manufacture various shaped multilevel blocks that may be used to construct both residential and commercial landscaping projects.

The present disclosure provides a mold system for manufacturing multilevel blocks wherein each of the blocks are strong, not prone to breaking, and can withstand lawn mowing equipment being moved over the blocks.

The present disclosure provides a mold system for manufacturing multilevel blocks with each of the blocks being small, lightweight, easy to handle, and are prone to not shift or tilt once installed.

The present disclosure also provides a mold system for manufacturing multilevel blocks that can be installed in numerous layouts, designs, and patterns.

The present disclosure provides a mold system for manufacturing multilevel blocks in which the blocks can be manufactured by use of a mold having a raised area and a mold screed or strike-off plate used in conjunction with the mold having a raised area to form the various blocks.

The present disclosure also provides a mold system for manufacturing multilevel blocks in which the blocks are locked together to control separating and to allow a mower to ride on or over the blocks to control movement of the blocks.

The present disclosure further provides a mold system for forming multilevel blocks in which various different shaped multilevel blocks may be formed at the same time.

These and other advantages of the present disclosure will become apparent after considering the following detailed specification in conjunction with the accompanying drawings, wherein:

BRIEF DESCRIPTION OF THE DRAWINGS

FIG. 9 is a perspective view of a plunger assembly shown partially in phantom that is used to form a multilevel tree ring block constructed according to the present disclosure;

FIG. 10 is a perspective view of a plunger assembly shown partially in phantom that is used to form a multilevel inside arc or radius block constructed according to the present disclosure;

FIG. 11 is a perspective view of a straight block of the landscape edging system constructed according to the present mold system for forming multilevel blocks;

FIG. 12 is a top view of the straight block of the landscape edging system constructed according to the present mold system for forming multilevel blocks;

FIG. 13 is a perspective view of an outside radius or tree ring block of the landscape edging system constructed according to the present mold system for forming multilevel blocks;

FIG. 14 is a top view of the tree ring block of the landscape edging system constructed according to the present mold system for forming multilevel blocks;

FIG. 15 is a perspective view of an inside radius block of the landscape edging system constructed according to the present mold system for forming multilevel blocks;

FIG. 16 is a top view of an inside radius block of the landscape edging system constructed according to the present mold system for forming multilevel blocks;

DETAILED DESCRIPTION OF PREFERRED EMBODIMENTS

Figure 1:
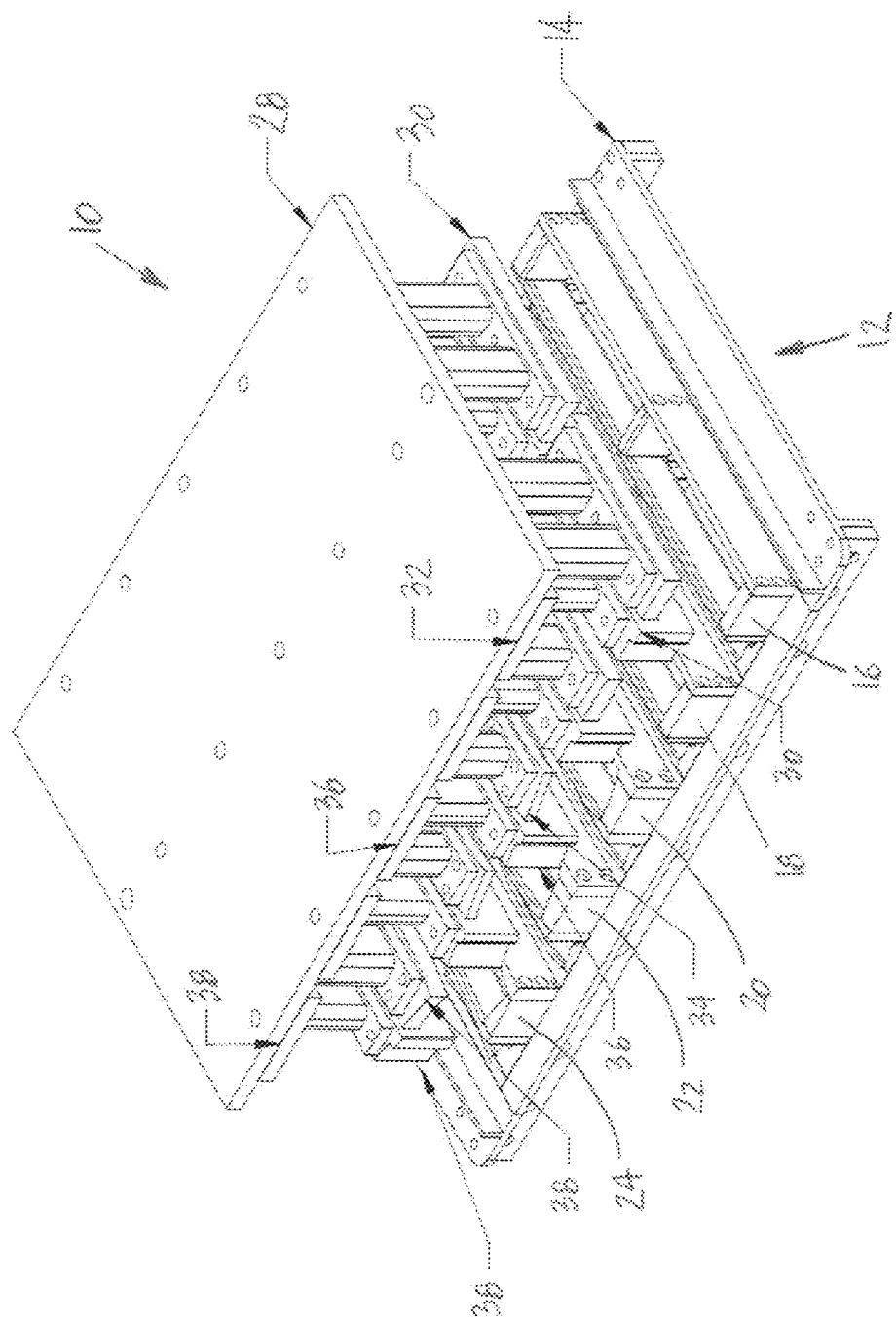
FIG. 1 is a perspective view of a mold system for forming multilevel blocks constructed according to the present disclosure.

Referring now to the drawings, wherein like numbers refer to like items, number 10 identifies a mold system for forming multilevel blocks in a machine, such as a block or paver machine, constructed according to the present disclosure. With reference now to FIG. 1, the mold system 10 comprises a mold box assembly 12 having a mold box frame 14 for receiving a number of multilevel mold box inserts 16, 18, 20, 22, and 24. The multilevel mold box inserts 16, 18, 20, 22, and 24 are sized and shaped to form multilevel blocks (not shown) of various configurations as will be discussed further herein. In particular, the mold box inserts 16 and 18 may be used to form straight blocks, the mold box inserts 20 and 22 may be used to form tree ring blocks or outside radius blocks, and the mold box insert 24 may be used to form an inside curved or radius block. The mold system 10 also comprises a press head plate 28 that has attached thereto a number of multilevel plunger assemblies 30, 32, 34, 36, and 38. The press head plate 28 is also adapted to be attached to a block or paver machine (not shown). The multilevel plunger assemblies 30, 32, 34, 36, and 38 are sized and shaped to assist in forming multilevel blocks being formed in the mold box inserts 16, 18, 20, 22, and 24. For example, the plunger assemblies 30 and 32 are used to form straight blocks, the plunger assemblies 34 and 36 are used to form tree ring blocks, and the plunger assemblies 38 is used to form an inside curved block. The mold box inserts 16, 18, 20, 22, and 24 are interchangeable on the mold box frame 14. In particular, the mold box frame 14 may have all of the mold box inserts being the mold box insert 16. In this case, there will be ten straight blocks formed. The other mold box inserts 20, 22, and 24 may be placed in or on the mold box frame 14, as required to form or manufacture other blocks. Further, the plunger assemblies 30, 32, 34, 36, and 38 are interchangeable as well. By way of example, if the mold box frame 14 is fitted with five of the mold box inserts 16 then the press head plate 28 will be fitted with ten of the plunger assemblies 30 in order to form the ten straights blocks. Although various numbers of mold box inserts and plunger assemblies are shown, it is contemplated that a different number of mold box inserts and plunger assemblies may be used by different types of block machines. Further, although not shown, it is to be understood that in a block or paver machine a production board or a steel plate will be placed under the mold box frame 14 by the machine to facilitate forming blocks in the mold system 10.

Figure 2:
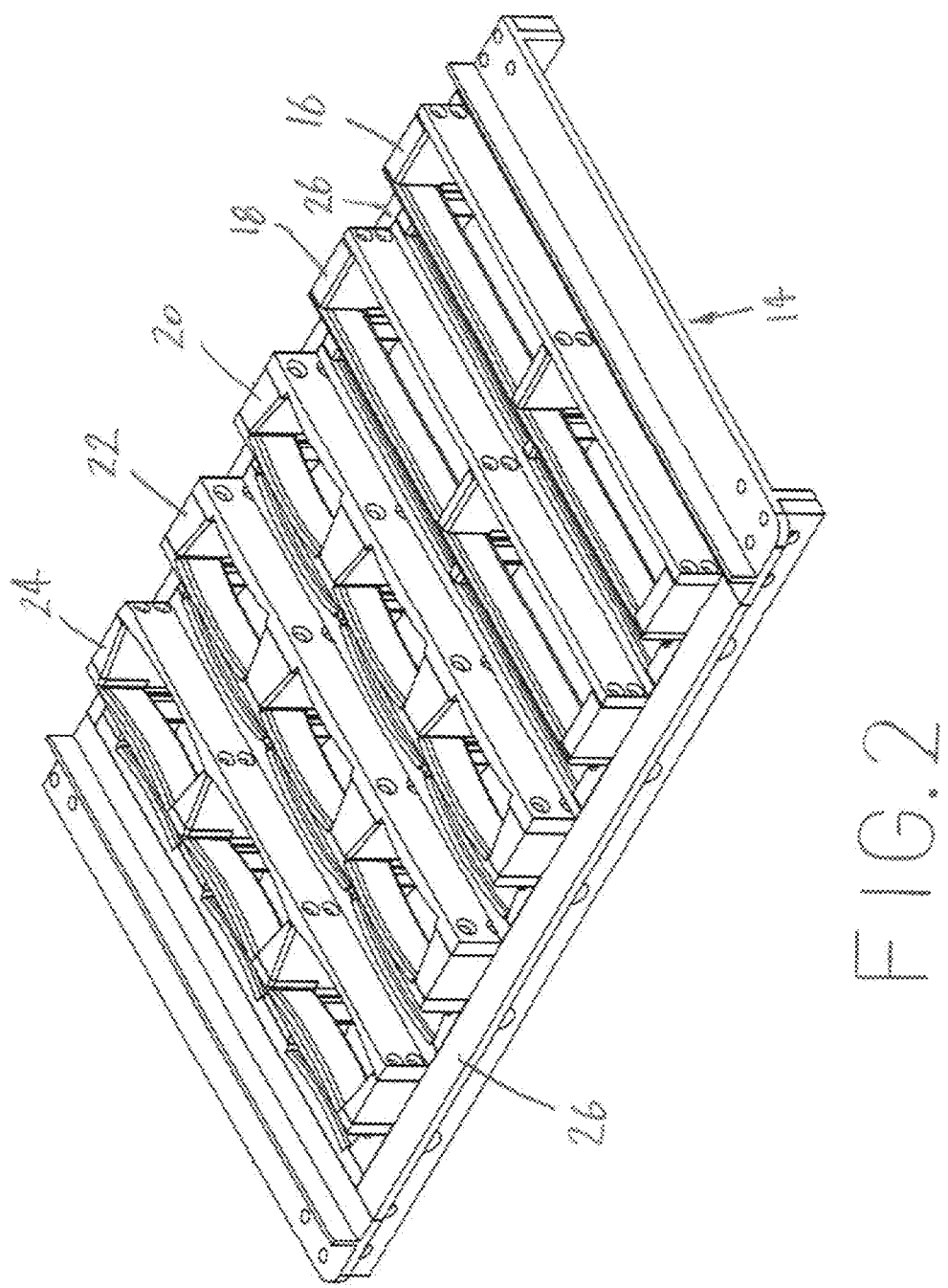
FIG. 2 is a perspective view of a mold box frame including mold box inserts constructed according to the present disclosure.

With reference now to FIG. 2, a perspective view of the mold box frame 14 is shown having the mold box inserts 16, 18, 20, 22, and 24 positioned therein or thereon. The mold box inserts 16, 18, 20, 22, and 24 may be positioned in the mold box frame 14 in any manner or configuration. For example, the mold box insert 22 may be removed and another mold box insert 16 may be positioned in its place. In this manner, six straight blocks may be formed using the mold system 10. It is also possible that the mold box insert 24 may be removed from the mold box frame 14 and only straight blocks and tree ring blocks may be formed in this particular arrangement. By further way of example, the mold box insert 18 may be reversed in orientation so that low sides of the blocks are formed back to back or both the mold box inserts 16 and 18 may be reversed so that high sides of the blocks are formed back to back. The mold box frame 14 is generally rectangular in shape. For purposes of example only, some possible standard dimensions for the mold box frame 14 are 26 inches wide by 18½ inches deep or 30 inches wide by 39 inches deep.

Figure 3:
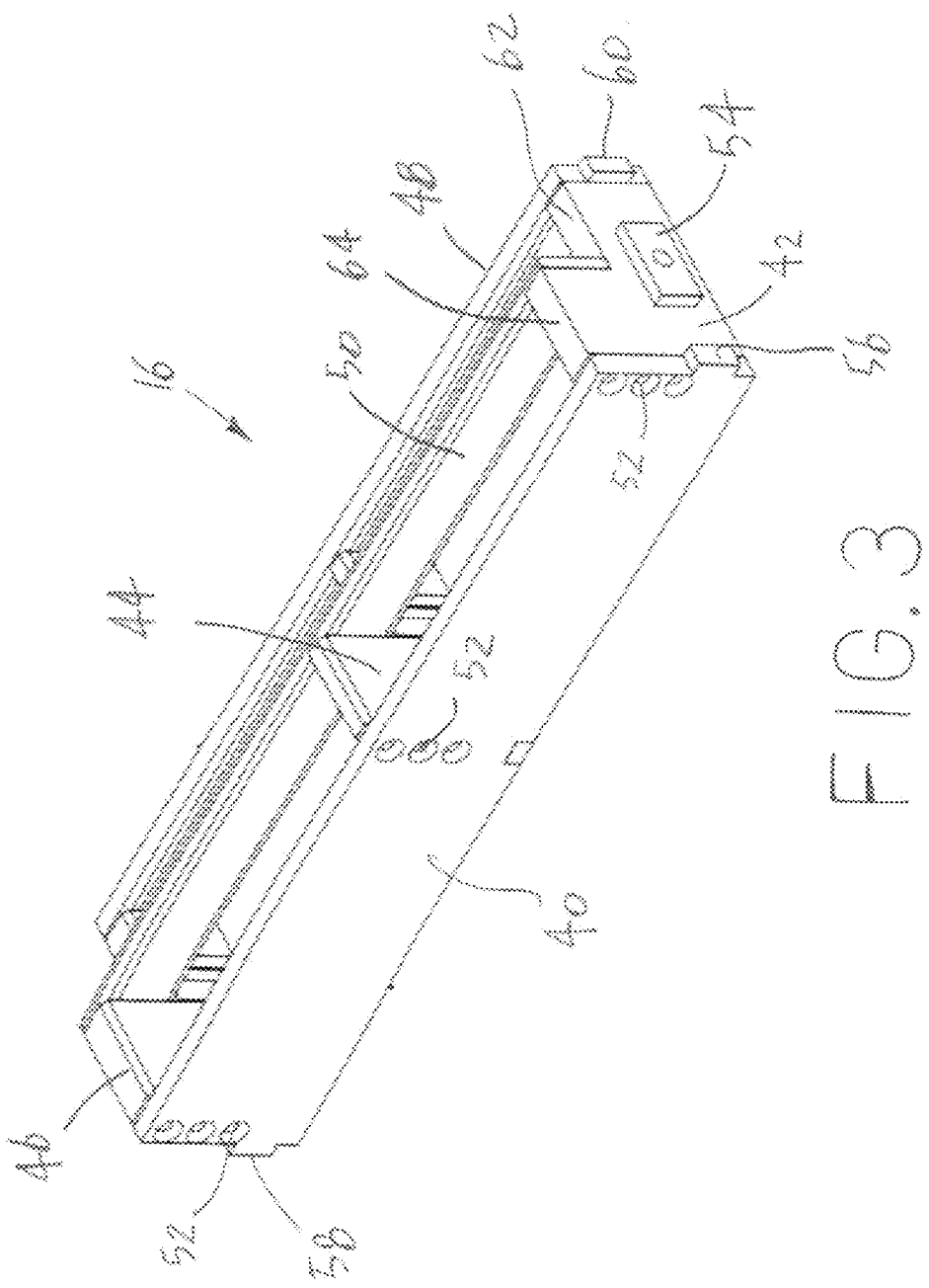
FIG. 3 is a perspective view of a mold box insert constructed according to the present disclosure that is used to form a multilevel straight block.

FIG. 3 is a perspective view of the mold box insert 16 that is used to form a straight multilevel straight block. The mold box insert 16 comprises a back panel 40, a right side panel 42, a central panel 44, a left side panel 46, a front panel 48, and an upper central panel 50. The panels 40, 42, 44, 46, 48, and 50 may be secured to each other by use on flathead countersunk bolts 52, screws, or other suitable securing elements. The right side panel 42 has a tab portion 54 that is used to hold the mold box insert 16 within the mold box assembly 12 of the mold box frame 14. In particular, the mold box frame 14 may have rails 26 (FIGS. 1 and 2) that are used to capture the tab portion 54. Although not shown in this view, there is another tab on the left side panel 46. The back panel 40 has a pair of tabs 56 and 58 that extend out from the back panel 40 and are used to be retained by the rails 26. The front panel 48 also has a tab 60 that is retained by the rails 26. Although not shown, there is another tab at the other end of the front panel 48. The right side panel 42 has a lower edge 62 and an upper edge 64. The edges 62 and 64 are used in part to form the multilevel block. As can be appreciated, any concrete placed in the openings of the mold box insert 16 will be formed into a pair of straight multilevel blocks. Further, the panels 40, 42, 44, 46, 48, and 50 may be constructed of steel plate or other suitable material. It is also possible that the mold box insert 16 may be formed of a unitary construction instead of component parts. It is also to be noted that the top openings of the insert 16 are beveled to facilitate alignment of the plunger assembly 30 during the manufacturing process.

Figure 4:
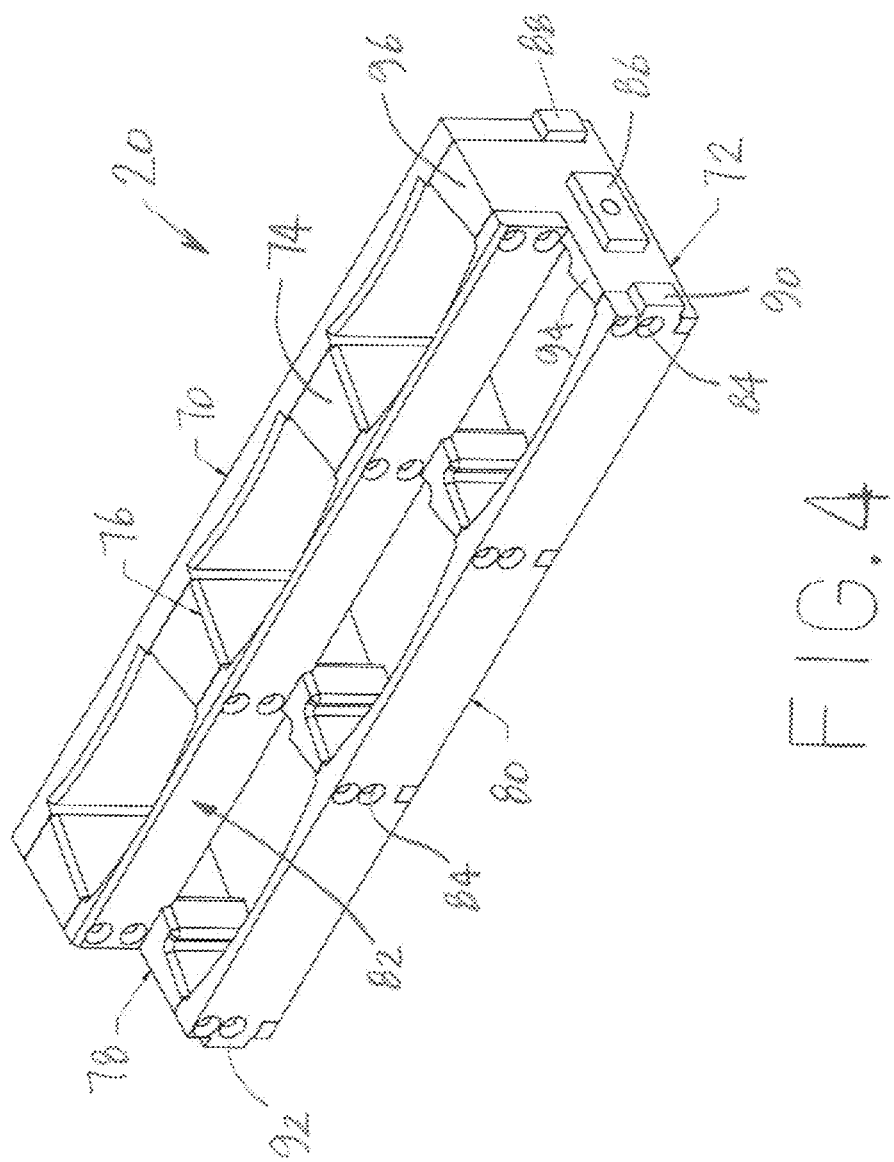
FIG. 4 is perspective view of a mold box insert constructed according to the present disclosure that is used to form a multilevel tree ring block or an outside radius block.

FIG. 4 is a perspective view of mold box insert 20 that is used to form three multilevel tree ring blocks. The mold box insert 20 comprises a back panel 70, a right side panel 72, a first central panel 74, a second central panel 76, a left side panel 78, a front panel 80, and a upper central panel 82. The panels 70, 72, 74, 76, 78, 80, and 82 may be secured to each other by use of flathead countersunk bolts 84, screws, or other suitable securing elements. The right side panel 72 has a tab portion 86 that is used to hold the mold box insert 20 within the mold box assembly 12 of the mold box frame 14 by being captured by the rail 26. Although not shown in this view, there is another tab on the left side panel 78. The back panel 70 has a tab 88 that extends out from the back panel 70 which is used to be retained by the rail 26 of the mold box frame 14. The other side of the back panel 70 also has a tab. The front panel 80 has a pair of tabs 90 and 92 that are captured by the rails 26 of the mold box frame 14. The right side panel 72 has a lower edge 94 and an upper edge 96. The edges 62 and 64 are used in part to form the multilevel block. The first central panel 74 and the second central panel 78 are used to separate the blocks and to form three separate multilevel tree ring blocks. Also, the panels 70, 72, 74, 76, 78, 80, and 82 may be constructed of steel plate or any other suitable material. Also, the insert 20 may be a unitary construction. Further, the top openings of the insert 20 are beveled to assist the plunger assembly 34 to be guided into the insert 20 during the manufacturing process.

Figure 5:
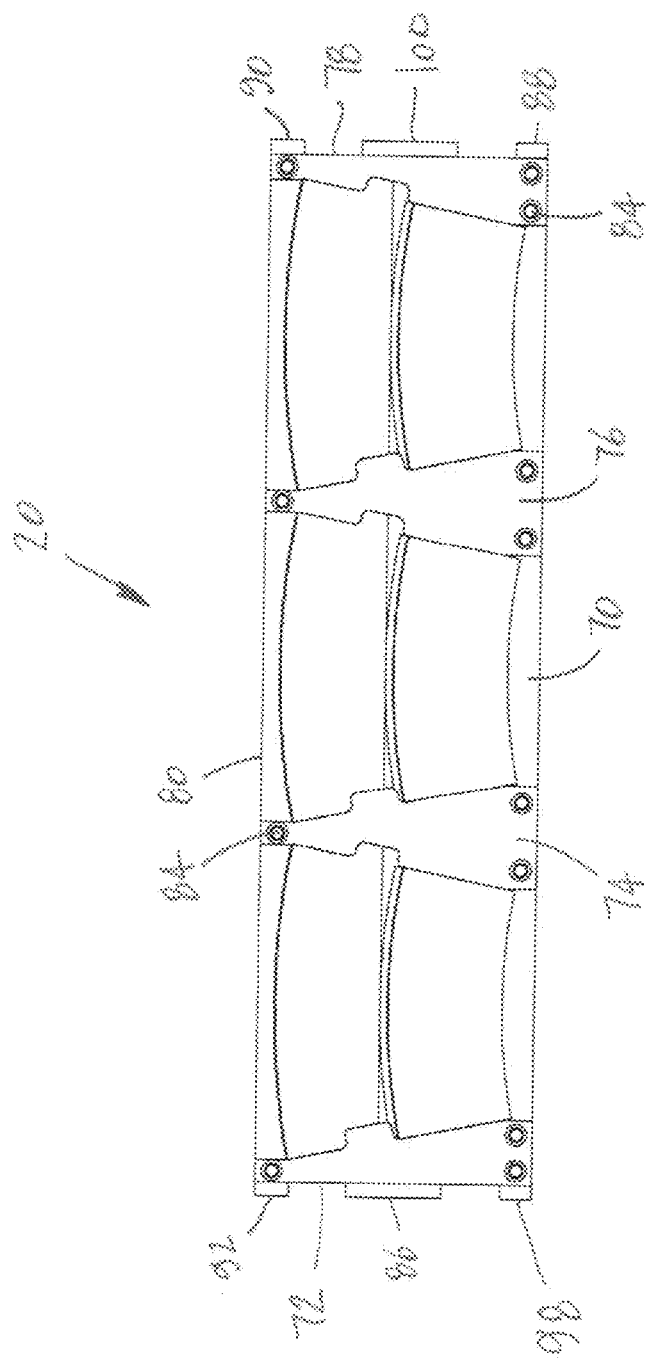
FIG. 5 is a bottom view of the mold box insert shown in FIG. 4.

Referring now to FIG. 5, a bottom view of the mold box insert 20 is depicted. The mold box insert 20 is shown to comprise the back panel 70, the right side panel 72, the first central panel 74, the second central panel 76, the left side panel 78, and the front panel 80. The panels 70, 72, 74, 76, 78, and 80 are shown held together by use of the bolts 84. A tab 98 is shown extending from the back panel 70 along the right side panel 72. Also, a tab 100, similar to the tab 86, is positioned along the left side panel 78. With use of the mold box insert 20, three multilevel tree ring blocks may be formed. Further, the openings in the bottom view of the mold box insert 20 are not beveled. This is due to the plunger assembly 34 never going fully through the insert 20 during the manufacturing process.

Figure 6:
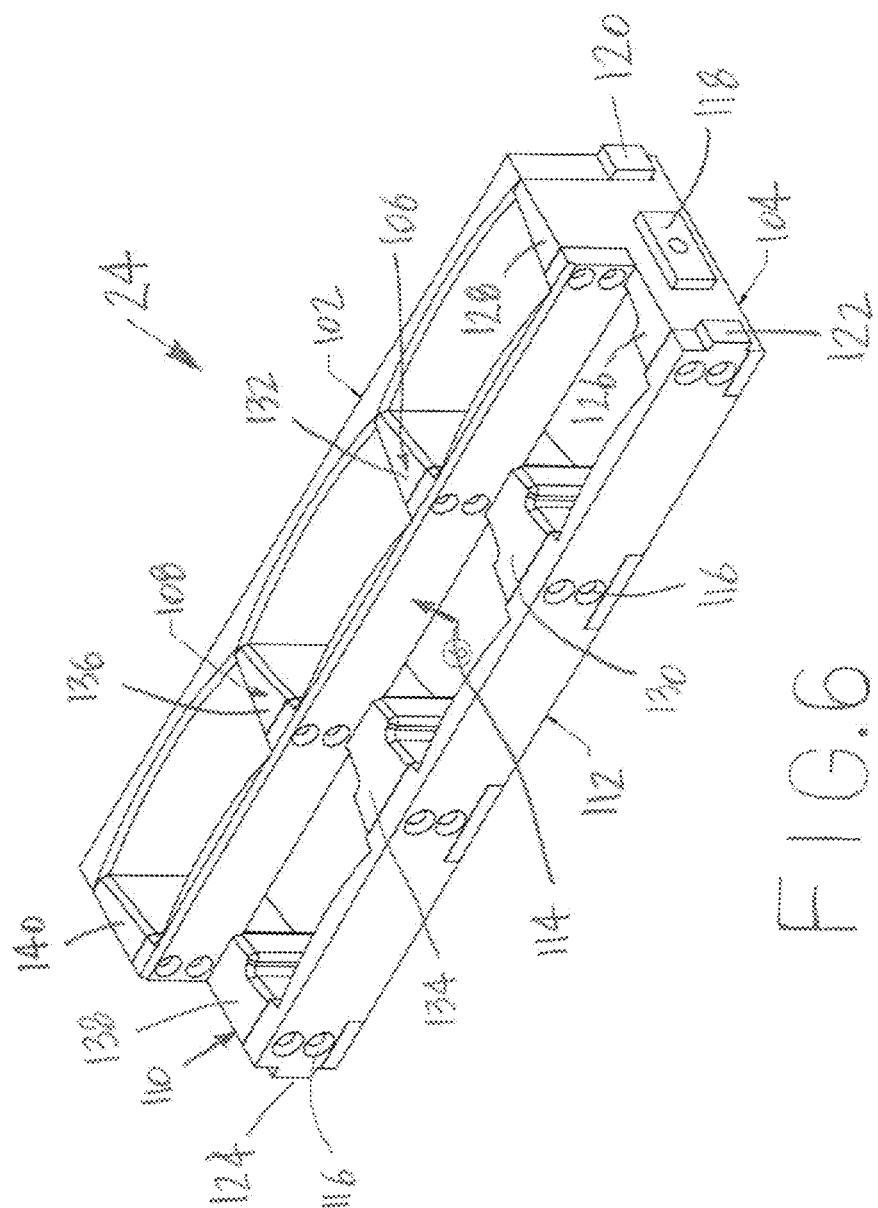
FIG. 6 is a perspective view of a mold box insert constructed according to the present disclosure that is used to form a multilevel inside arc or radius block.

FIG. 6 is a perspective view of the mold box insert 24 that is used to form a multilevel inside radius or curved block. The mold box insert 24 comprises a back panel 102, a right side panel 104, a first central panel 106, a second central panel 108, a left side panel 110, a front panel 112, and an upper central panel 114. The panels 102, 104, 106, 108, 110, 112, and 114 may be secured to each other by use of flathead countersunk bolts 116, screws, or other suitable securing elements. The right side panel 104 has a tab portion 118 that is used to hold the mold box insert 24 within the mold box frame 14 of the mold box assembly 12 by being captured by the rail 26. Although not shown in this view, there is another tab on the left side panel 110. The back panel 102 has a tab 120 that extends out from the back panel 102 which is used to be retained by the rail 26. The other side of the back panel 102 also has a tab. The front panel 112 has a pair of tabs 122 and 124 that are captured by the rails 26. The right side panel 104 has a lower edge 126 and an upper edge 128. The edges 126 and 128 are used to form the multilevel block. The first central panel 106 has a lower edge 130 and an upper edge 132. The second central panel 108 also has a lower edge 134 and an upper edge 136. The left side panel 110 is also formed to have a lower edge 138 and an upper edge 140. The first central panel 106 and the second central panel 108 are used to separate the blocks and to form three separate multilevel inside arc blocks. As indicated above, the panels 102, 104, 106, 108, 110, 112, and 114 may be constructed of steel plate or any other suitable material. Further, instead of component parts, the mold box insert 24 may be a unitary construction.

Figure 7:
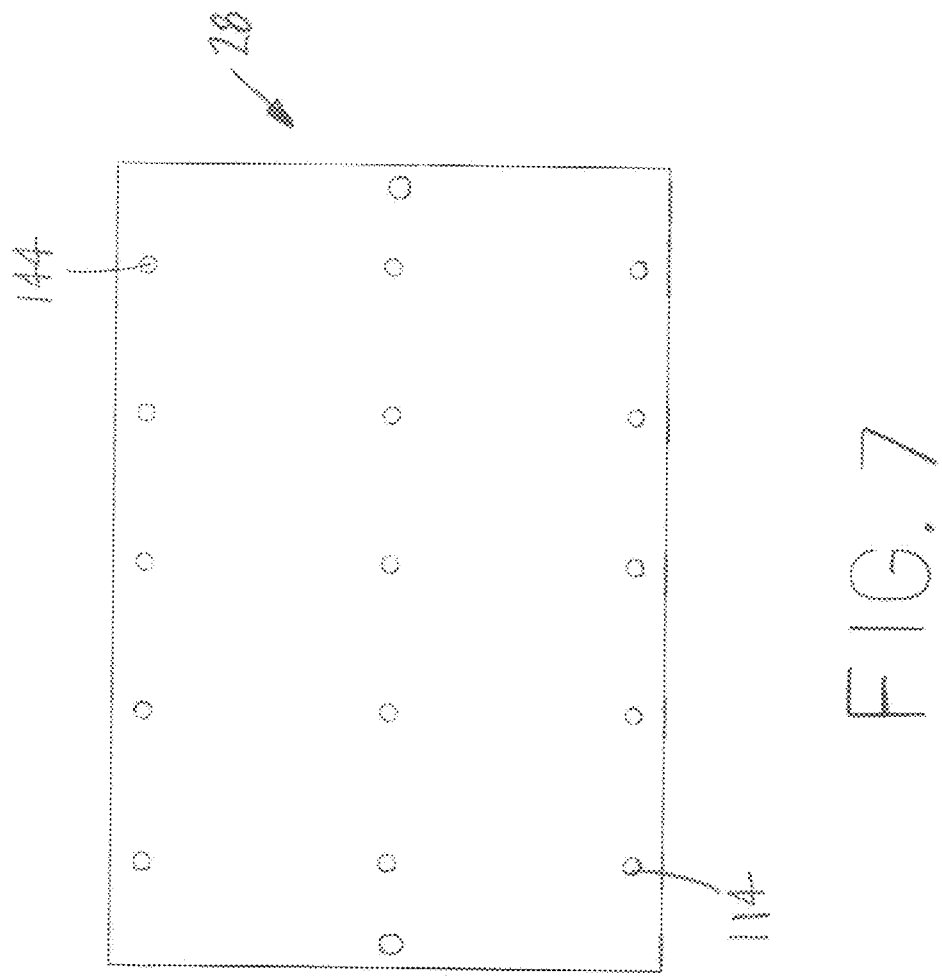
FIG. 7 is a top view of a plunger head plate constructed according to the present disclosure.

FIG. 7 is a top view of the press head plate 28. The press head plate 28 is generally rectangular in shape and has a plurality of mounting holes 144 formed therein. The mounting holes 144 are used to mount the plunger assemblies 30, 32, 34, 36, and 38 to the press head plate 28 by use of bolts, screws, or other suitable securing or mounting devices. With this particular press head plate 28, up to five plunger assemblies may be mounted or attached thereto. However, it is possible that the press head plate 28 may be constructed to accommodate more plunger assemblies by use of more mounting holes 144 formed therein. It is also contemplated that the press head plate 28 may have fewer plunger assemblies mounted thereto by use of fewer mounting holes 144.

Figure 8:
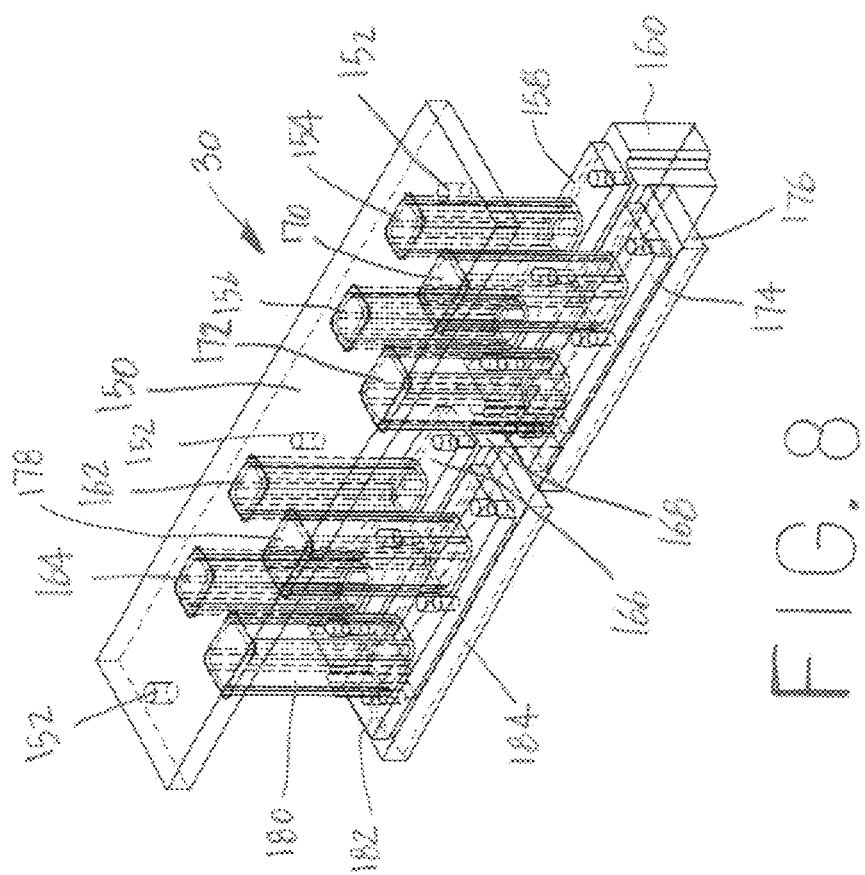
FIG. 8 is a perspective view of a plunger assembly shown partially in phantom that is used to form a multilevel straight block constructed according to the present disclosure.

Referring now to FIG. 8, the plunger assembly 30 is illustrated. The plunger assembly 30 comprises a top mounting plate 150 have mounting holes 152 that correspond to the mounting holes 144 of the press head plate 28. Aligning the holes 144 and 152 will allow the plunger assembly 30 to be mounted to the press head plate 28 by use of any suitable mounting device such as bolts or screws. The top mounting plate 150 has a first front pair of tubes 154 and 156 connected thereto and a first front press plate mounting plate 158 connected to the tubes 154 and 156 with a first front press plate 160 connected to the first front press plate mounting plate 158. The first front press plate 160 is adapted to be pressed down on material in the mold box insert 16 to facilitate forming of a block. The top mounting plate 150 has a second front pair of tubes 162 and 164 connected thereto and a second front press plate mounting plate 166 connected to the tubes 162 and 164. A second front press plate 168 is connected to the second front press plate mounting plate 166. The second front press plate 168 is used to press down on material in the mold box insert 16. A first rear pair of tubes 170 and 172 are connected to the top mounting plate 150. The first rear pair of tubes 170 and 172 have a first rear press plate mounting plate 174 connected thereto. Attached to the first rear press plate mounting plate 174 is a first rear press plate 176. The top mounting plate 150 also has a second rear pair of tubes 178 and 180 connected thereto. The second rear pair of tubes 178 and 180 have a second rear press plate mounting plate 182 connected to the tubes 178 and 180. A second rear press plate 184 is attached to the second rear press plate mounting plate 182. As can be appreciated, the press plates 160, 168, 176, and 184 are used to be pressed down on material in the mold box insert 16 to assist in forming a straight multilevel block. Also, the press plates 160, 168, 176, and 184 are shaped in the same shape as openings in the mold box insert 16. It is also possible that the tubes 154, 156, 162, 164, 170, 172, 178, and 180 may be welded directly to the press head plate 28.

FIG. 9 shows the plunger assembly 34. The plunger assembly 34 comprises a top mounting plate 200 have mounting holes 202 that correspond to the mounting holes 144 of the press head plate 28. Aligning the holes 144 and 202 will allow the plunger assembly 34 to be mounted to the press head plate 28 by use of any suitable mounting device such as bolts or screws. The top mounting plate 200 has a first front tube 204 connected thereto, a first front press plate mounting plate 206, and a first front press plate 208 connected to the first front press plate mounting plate 206. The first front press plate 208 is adapted to be pressed down on material in the mold box insert 20 to facilitate forming of a block. The top mounting plate 200 has a second front tube 210 connected thereto and a second front press plate mounting plate 212 connected to the tube 210. A second front press plate 214 is connected to the second front press plate mounting plate 212. A third front tube 216 is connected to the plate 200. The third front tube 216 also has a third front press plate mounting plate 218 connected thereto and a third front press plate 220 connected to the plate 218. A first rear tube 222 is connected to the top mounting plate 200. The first rear tube 222 has a first rear press plate mounting plate 224 connected thereto and a first rear press plate 226 attached to the plate 224. The top mounting plate 200 also has a second rear tube 228 connected thereto. The second rear tube 228 has connected thereto a second rear press plate mounting plate 230 and attached to the plate 230 is a second rear press plate 232. A third rear tube 234 is connected to the plate 200. The third rear tube 234 has a third rear press plate mounting plate 236 and a third rear press plate 238. As can be appreciated, the press plates 208, 214, 220, 226, 232, and 238 are used to be pressed down on material in the mold box insert 20 to assist in forming a tree ring or outside radius shaped multilevel block. Also, the press plate 208, 214, 220, 226, 232, and 238 are shaped in the same shape as the mold box insert 20. With use of the plunger assembly 34, three tree ring shaped multilevel blocks may be formed. It is also possible that the tubes 204, 210, 216, 222, 228, and 234 may be welded directly to the press head plate 28.

With reference now to FIG. 10, a perspective view of the plunger assembly 38 that is used to manufacture multilevel inside radius blocks is illustrated. The plunger assembly 38 has a top mounting plate 250 have mounting holes 252 that correspond to the mounting holes 144 of the press head plate 28. The holes 252 are aligned with the holes 144 to connect the plates 28 and 250 together. The plate 250 has a first front tube 254 connected thereto, a first front press plate mounting plate 256, and a first front press plate 258 connected to the first front press plate mounting plate 256. The first front press plate 258 is adapted to be pressed down on material the mold box insert 24 to facilitate forming of a block. The top mounting plate 250 has a second front tube 260 connected thereto and a second front press plate mounting plate 262 connected to the tube 260. A second front press plate 264 is connected to the second front press plate mounting plate 262. A third front tube 266 is connected to the plate 250. The third front tube 266 also has a third front press plate mounting plate 268 connected thereto and a third front press plate 270 connected to the plate 268. A first rear tube 272 is connected to the top mounting plate 250. The first rear tube 272 has a first rear press plate mounting plate 274 connected thereto and a first rear press plate 276 attached to the plate 274. The top mounting plate 250 also has a second rear tube 278 connected thereto. The second rear tube 278 has connected thereto a second rear press plate mounting plate 280 and attached to the plate 280 is a second rear press plate 282. A third rear tube 284 is connected to the plate 250. The third rear tube 284 has a third rear press plate mounting plate 286 and a third rear press plate 288. As can be appreciated, the press plates 258, 264, 270, 276, 282, and 288 are used to be pressed down on material in the mold box insert 24 to assist in forming an inside arc shaped multilevel block. Also, the press plates 258, 264, 270, 276, 282, and 288 are shaped in the same shape as the mold box 38. With the use of the plunger assembly 38 three inside radius shaped multilevel blocks may be formed. It is also possible that the tubes 254, 260, 266, 272, 278, and 284 may be welded directly to the press head plate 28.

As discussed previously, although two tiers have been shown, it is possible and contemplated that three or more tiers may be formed by use of the plunger assemblies 30, 32, 34, 36, and 38 by adding more tubes, press plate mounting plates, and press plates as the case may require. For example, for a block having three tiers or levels, three additional tubes will be connected to the top mounting plate 250. The tubes will each then have connected to an opposite end thereof a press plate mounting plate and a press plate. In this manner, various multilevel shaped blocks may be formed and manufactured.

FIG. 11 is a perspective view of a straight block 330 which is constructed using the mold system for forming multilevel blocks 10 of the present disclosure. In particular, the mold press box insert 16 along with the plunger assembly 30 may be used to form the straight block 330. The straight block 330 comprises a back face 332 and a bottom face 334, an elevated top portion 336, a lower top portion 338, an elevated front face 340 between the elevated top portion 336 and the lower top portion 338, a lower side front face 342, a right elevated side face 344, a right lower side face 346 having a tongue portion 348 extending out from the right lower side face 346, a left elevated side face 350, a left lower side face 352 having a groove portion 354 formed in the left lower side face 352. The tongue portion 348 extends between the bottom face 334 and the lower top portion 338. The lower top portion 338 serves as the edge 322 that lawn mowing equipment may ride upon when cutting grass. The faces 334, 340, 342, 344, 346, 350, 352 and the top portion 336 and the lower top portion 338 are generally planar and rectangular in shape.

Referring to FIG. 12, a top view of the straight block 330 is depicted. The straight block 330 is shown comprising the back face 332, the elevated top portion 336, the lower top portion 338, and the elevated front face 340 between the elevated top portion 336 and the lower top portion 338. The block 330 further comprises the lower side front face 342, the right elevated side face 344, the right lower side face 346 having the tongue portion 348 extending out from the right lower side face 346, and the left elevated side face 350. The left lower side face 352 has the groove portion 354 formed therein and also is formed in the lower top portion 338. The tongue portion 348 extends between the bottom face 334, which is not shown in this particular view, and the lower top portion 338. The lower top portion 338 serves as the platform or edge 322 upon which lawn mowing equipment may ride upon when cutting grass.

An eased, beveled, or rounded edge 360 is formed between back face 332 and the elevated top portion 336. Another eased or rounded edge 362 is formed between the elevated top portion 336 and the elevated front face 340. Between the elevated front face 340 and the lower top portion 338 is formed a rounded edge 364. Also, another eased or rounded edge 366 is formed between the lower top portion 338 and the lower side front face 342. The edges 360, 362, 364, and 366 are eased, beveled, or rounded to prevent the straight block 330 from being broken or chipped during manufacturing, transportation, storage, installation, or handling. Also, the tongue portion 348 may have rounded edges 368 and the groove portion 354 may have rounded edges 370. The rounded edges 368 and 370 prevent cracks initiating during the manufacturing process. As can be appreciated, when a line of straight blocks 330 are placed side by side, the tongue portion 348 of one of the blocks 330 may be inserted into the groove portion 354 of the adjacent block 330. In this manner, the blocks 330 may be joined or mated together.

For purposes of example only, some possible standard dimensions for the straight block 330 are as follows. The straight block 330 may be four inches tall at the back face 332, two inches tall at the lower side front face 342, six inches deep along the bottom face 334, and twelve inches wide along both the back face 332 and the lower side front face 342. The tongue portion 348 may extend out 7/16 inches, have a width of 7/8 inches, and have a height of two inches. The groove portion 354 may have a depth of 1/2 inches, a width of one inch, and a height of two inches. In this manner, the tongue portion 348 will fit within the groove portion 354. Another reason that the tongue portion 348 has a width of 7/8 inches and the groove portion 354 has a width of one inch is due to the manufacturing process. When manufacturing or molding the block 330, as will be described in more detail herein, a mold in which the block 330 is formed will wear down over time. In order to allow a mold to be used for as long as possible, these tolerances are built in to the block 330. It should be apparent that the tongue portion 348 and the groove portion 354 are positioned along the right lower side face 346 and the left lower side face 352, respectively. In this configuration, the tongue portion 348 and the groove portion 354 are not part of either the right elevated side face 344 or the left elevated side face 350. Further, by having the tongue portion 348 and the groove portion 354 positioned along the side faces 346 and 352, respectively, the connection between a pair of blocks 330 is strengthen and this helps prevent movement of the blocks 330 when lawn mowing or cutting equipment is placed on the lower top portion 338. Other reasons for positioning the tongue portion 348 on the side face 346 and the groove portion 354 on the side face 352 are that such a construction is easier to manufacture, it does not detract from the appearance of the block 330, and it prevents separation of the blocks 330 on an uneven surface such as a slight inclined or uphill surface.

FIG. 13 illustrates a perspective view of a tree ring or outside radius block 400 constructed according to the present disclosure. The mold press box insert 20 and the plunger assembly 34 may be used to form the tree ring block 400. The tree ring block 400 comprises a back face 402 that is configured to be placed against a raised area and a bottom face 404 for placement in the ground, an elevated top portion 406, a lower top portion 408, an elevated front face 410 positioned between the elevated top portion 406 and the lower top portion 408, a lower side front face 412, a left elevated side face 414, a left lower side face 416 having a groove portion 418 formed in the left lower side face 416. The lower top portion 408 serves as an edge that lawn mowing equipment may ride upon when cutting grass.

With reference now to FIG. 14, a top perspective view of the tree ring block 400 is illustrated. The tree ring block 400 further comprises a right elevated side face 420 and a right lower side face 422 having a groove portion 424 formed in the right lower side face 422. The groove portion 424 extends between the bottom face 404, which is not shown in this particular view, and the lower top portion 408. The tree ring block 400 is also shown to comprise the back face 402, the elevated top portion 406, the lower top portion 408, the elevated front face 410, and the lower side front face 412. The left lower side face 416 has the tongue portion 418 extending out from the left lower side face 416. The tongue portion 418 is adapted to be placed or positioned in the groove portion 424 of an adjoining block 330 or 400.

An eased, beveled, or rounded edge 426 is formed between back face 402 and the elevated top portion 406. Another eased or rounded edge 428 is formed between the elevated top portion 406 and the elevated front face 410. Between the elevated front face 410 and the lower top portion 408 is formed a rounded edge 430. Also, another eased or rounded edge 432 is formed between the lower top portion 408 and the lower side front face 412. The edges 426, 428, 430, and 432 are eased, beveled, or rounded to prevent the block 400 from being broken or chipped during manufacturing, transportation, storage, installation, or handling. Also, the tongue portion 418 may have rounded edges 434 and the groove portion 424 may have rounded edges 436. The rounded edges 434 and 436 prevent cracks from initiating during the manufacturing process. As can be appreciated, when a outside radius circular border is required, the outside radius block 400 may be used. Each of the blocks 400 is arcuate in shape and has a radius of 22.5°. A total of sixteen of the blocks 400 may be used to form a complete circle for a ring around a tree. Also, the tongue portion 348 of the straight block 330 may be inserted into the groove portion 424 of the block 400 to form an outside radius border.

Again, for purposes of example only, some possible standard dimensions for the outside radius block 400 are a height of four inches at the back face 402, two inches tall at the lower side front face 412, and six inches deep along the bottom face 404. The tongue portion 418 may extend out 7/16 inches, have a width of 7/8 inches, and have a height of two inches. The groove portion 424 may have a depth of 1/2 inches, a width of one inch, and a height of two inches. In this manner, the tongue portion 418 will fit within the groove portion 424. It should be apparent that the tongue portion 418 and the groove portion 424 are positioned along the left lower side face 416 and the right lower side face 422, respectively.

Referring now to FIG. 15, an inside radius block 450 is shown that may be constructed by use of the mold box insert 24 and the plunger assembly 28 of the present mold system 10. The inside radius block 450 comprises a back face 452 that is configured to be placed against a raised area and a bottom face 454 for placement in the ground, an elevated top portion 456, a lower top portion 458, an elevated front face 460 between the elevated top portion 456 and the lower top portion 458, a lower side front face 462, a left elevated side face 464, a left lower side face 466 having a groove portion 468 formed in the left lower side face 466. The lower top portion 458 serves as an edge that lawn mowing equipment may travel or ride upon when cutting the grass.

FIG. 16 illustrates a top perspective view of the inside radius block 450. The inside radius block 450 further comprises a right elevated side face 470 and a right lower side face 472 having a tongue portion 474 extending out from the right lower side face 472. The tongue portion 474 extends between the bottom face 454, which is not shown in this particular view, and the lower top portion 458. The inside radius block 450 is also shown to comprise the back face 452, the elevated top portion 456, the lower top portion 458, the elevated front face 460, and the lower side front face 462. The left lower side face 466 has the groove portion 468 formed and the groove portion 468 is adapted for receiving a tongue portion 474 of an adjoining block 330 or 450. The groove portion 468 is formed in the left lower side face 466, the lower top portion 458, and the bottom face 454. As can be appreciated, the inside radius block 450 is used to form a border when an inside radius is required. Further, each of the blocks 450 is arcuate in configuration and has a radius of 22.5°. Due to this construction, a total of sixteen of the blocks 450 may be used to form a complete circular border.

With reference now to both FIGS. 15 and 16, an eased, beveled, or rounded edge 476 is formed between back face 452 and the elevated top portion 456. Another eased or rounded edge 478 is formed between the elevated top portion 456 and the elevated front face 460. Between the elevated front face 460 and the lower top portion 458 is formed a rounded edge 480. Also, another eased or rounded edge 482 is formed between the lower top portion 458 and the lower side front face 462. The edges 476, 478, 480, and 482 are eased, beveled, or rounded to prevent the block 450 from being broken or chipped during manufacturing, transportation, storage, installation, or handling. Also, the tongue portion 474 may have rounded edges 484 and the groove portion 468 may have rounded edges 486. The rounded edges 484 and 486 are used to prevent cracks from initiating during the manufacturing process.

As has been referenced previously, the block 450 may be formed in sizes that are standardized. Some possible standard dimensions for the inside radius block 450 are a height of four inches at the back face 452, two inches tall at the lower side front face 462, and six inches deep along the bottom face 454. The tongue portion 474 may extend out 7/16 inches, have a width of 7/8 inches, and have a height of two inches. The groove portion 468 may have a depth of ½ inches, a width of one inch, and a height of two inches. In this manner, the tongue portion 474 will fit within the groove portion 468. It should be apparent that the tongue portion 474 and the groove portion 468 are positioned along the right lower side face 472 and the left lower side face 466, respectively. In this configuration, the tongue portion 474 and the groove portion 468 are not part of either the right elevated side face 470 or the left elevated side face 464. It should be apparent that the blocks 330, 400, and 450 have the same sized tongues and grooves that allow the blocks 330, 400, and 450 to be placed in any sequence or configuration.

Figure 17:
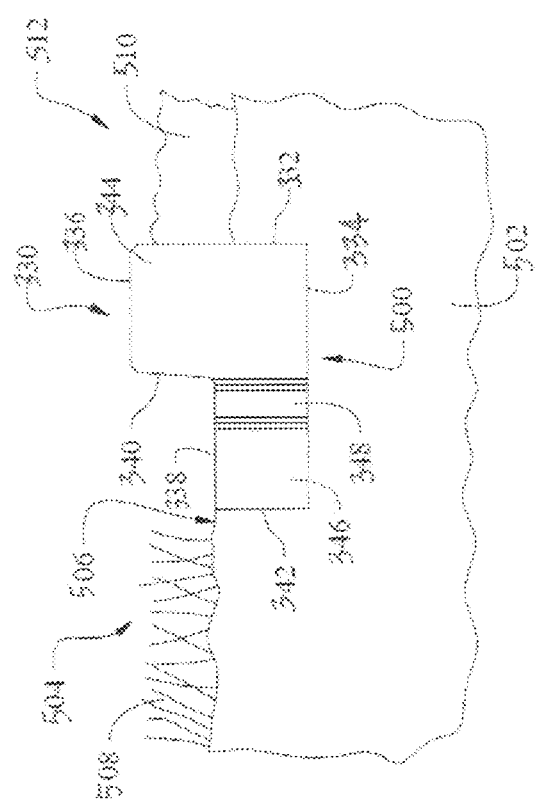
FIG. 17 is an end view of the straight block constructed according to the present mold system for forming multilevel blocks being installed in the ground in a landscaped area.

As depicted in FIG. 17, a straight block 330 is shown being installed in a dugout or trench area 500 of soil 502 in the ground 504. The trench area 500 may be excavated which approximates the size of the block 330 and the desired border configuration. The trench area 500 is dug deep enough so that the lower top portion 338 of the straight block 330 is level with a ground level 506 of the ground 504. Although not shown, it is also possible to provide a leveling base, such as crushed rock, on the soil 502 to place the bottom face 334 of the block 330. The ground level 506 has grass 508 on a side in which the top portion 338 is presented to allow a lawn mower (not shown) to ride or travel over when cutting the grass 508. The back side 332 of the block 330 is shown abutting up against mulch 510 that is in a landscaped area 512. In this manner, the block 330 is able to keep the mulch 510 within the landscaped area 512 and also to provide the lower top portion 338 as a surface upon which the lawn mower may move or travel. The lower top portion 338 allows the grass 508 to be cut without having to go back and trim the area between the grass 508 and the mulch 510 if the landscape edging block 330 had not been installed. Again, since the lower top portion 338 is level or flush with the ground level 506, a lawn mower may ride continuously along the lower top portion 338 of the block 330 when cutting the grass 508. Once the block 330 is installed, another block 330 may have its groove portion 354 (not shown) placed over the tongue portion 348 to lock the two blocks 330 together. Further, due to the standardization of the tongue portions and groove portions of the blocks 330, 400, and 450 described herein, any of the blocks may be connected together to form any shape and sized border configuration. Also, although the block 330 is depicted as being installed in the trench area 500, it is also possible and contemplated to install any of the other blocks 400 and 450 in the same manner.

Figure 18:
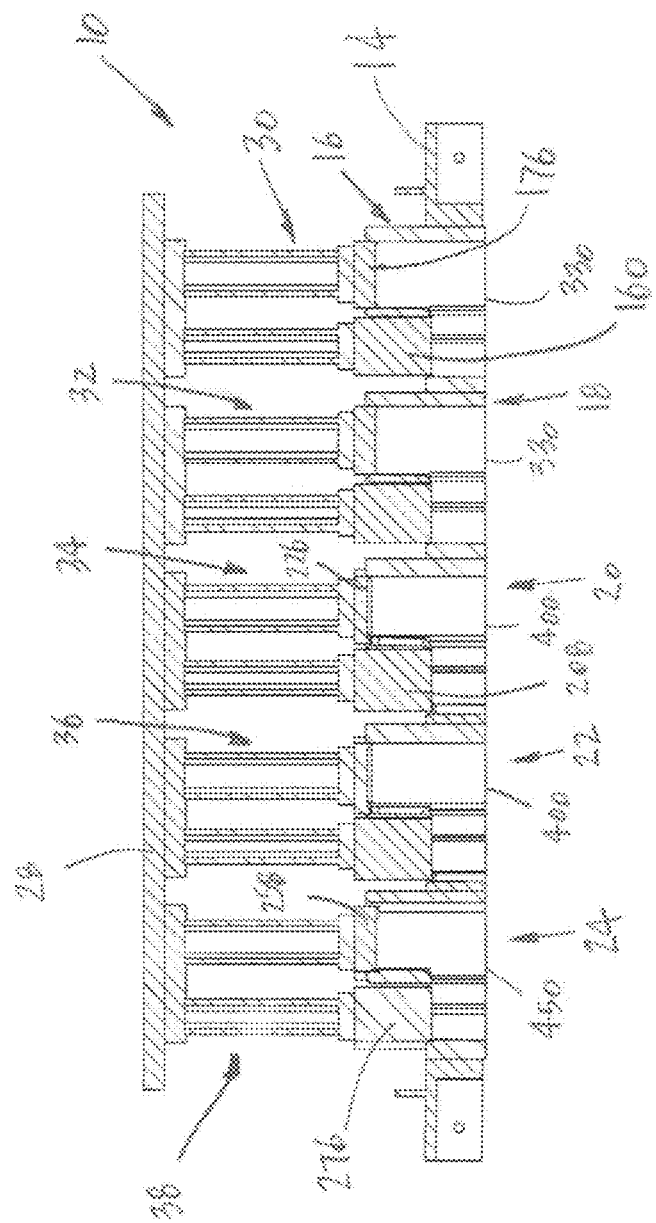
FIG. 18 is a cross-sectional view of the present mold system in a forming position forming a number of multilevel blocks.

FIG. 18 shows a cross-sectional view of the mold system 10 in position forming the blocks 330, 400, and 450. The mold box frame 14 has the mold box inserts 16, 18, 20, 22, and 24 placed thereon or therein and has been moved into position in a machine (not shown) for automating manufacturing of blocks. Material, such as concrete, has been dropped into the mold boxes 16 and a screed bar (not shown) has been moved over the material to remove excess material. The plunger assemblies 30, 32, 34, 36, and 38 have been moved into position to compress the material in the mold box inserts 16, 18, 20, 22, and 24. It is also known that the machine may vibrate the material at the same time the plunger assemblies 30, 32, 34, 26, and 38 are compressing the material. In this manner, the blocks 330, 400, and 450 are formed. In this particular configuration, four of the straight blocks 330, six of the tree ring blocks 400, and three of the inside radius blocks 450 may be formed at a time. It should be noticed that the thickness of the press plate 160 of the plunger assembly 30 is thicker than the press plate 176. The thicker press plate 160 helps during the stripping cycle to keep the flat surface 338 of the block 330 (FIGS. 11 and 12) in place. Also, the top of the thicker press plate 160 never moves below the bottom of the mold box insert 16 to release the plunger assembly 30 from the material being compressed. The press plate 208 is also thicker than the press plate 226 of the plunger assembly 34. Further, the press plate 276 is thicker than the press plate 258 of the plunger assembly 38.

Figure 19:
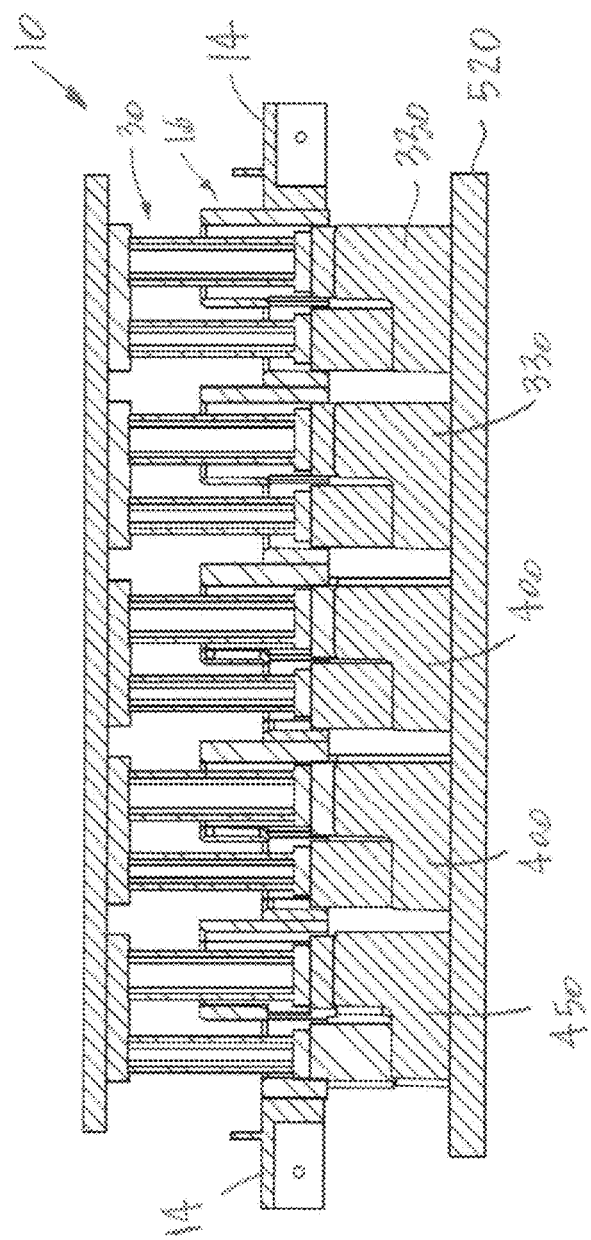
FIG. 19 is a cross-sectional view of the present mold system in a stripping position forming a number of multilevel blocks.

Referencing now FIG. 19, a cross-sectional view of the mold system 10 in which the mold box frame 14 and the mold box inserts 16, 18, 20, 22, and 24 have been moved upwardly to strip the mold system 10 away from the blocks 330, 400, and 450. The plunger assemblies 30, 32, 34, 36, and 38 are still in contact with the blocks 330, 400, and 450 in this particular step of the process. The formed blocks 330, 400, and 450 are left on a board 520 for further processing. In this manner, the mold system 10 is able to form the blocks 330, 400, and 450. Once the forming process is complete, the blocks 330, 400, and 450 sitting on the board 520 may be sent down an assembly line or removed from the machine for curing. For example, the board 520 holding the blocks 330, 400, and 450 may be moved to a curing room for a period of time.

Figure 20:
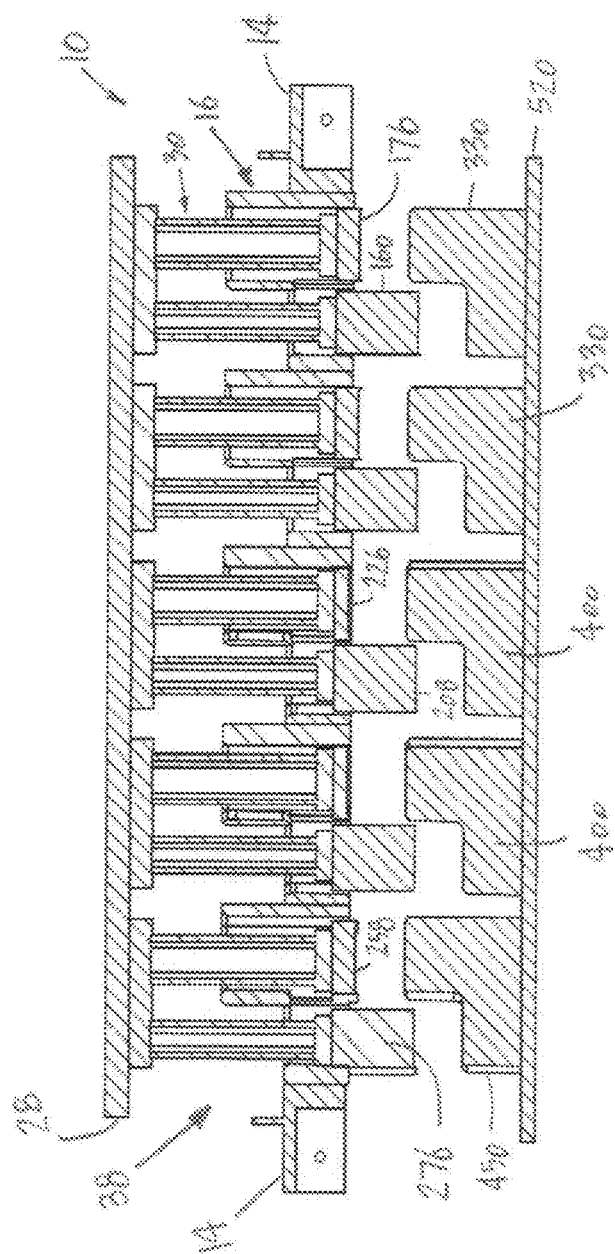
FIG. 20 is a cross-sectional view of the present mold system in a further stripping position forming a number of multilevel blocks.

FIG. 20 illustrates a further step in the manufacturing process in which the plunger assemblies 30, 32, 34, 36, and 38 have been moved upwardly to completely strip the mold system 10 away from the blocks 330, 400, and 450. The formed blocks 330, 400, and 450 are left positioned on the board 520 for further processing, as previously described. As further depicted in this drawing and which has been previously indicated, the thicker press plate 160 never moves below the bottom of the mold box insert 16 when the plunger assembly 30 is released from the material being compressed. The press plates 208 and 226 do not move below the bottom of the mold box insert 20 and the press plates 258 and 276 also do not move below the bottom of the mold box insert 24.

As can be appreciated, the blocks 330, 400, and 450 of the present disclosure are formed in suitable mold box inserts 16, 20, 24, respectively. Generally, the process entails molding the blocks 330, 400, and 450 by using a mixture of cement, rock, sand, water, and other materials. Once the mixture is inserted into each of the openings of the mold box inserts 16, 20, and 24 of the mold box assembly 12, a screed or strike-off plate is passed over the mold box assembly 12 to remove any excess mixture. The blocks 330, 400, and 450 are fabricated by compressing and vibrating the mixture in the mold box assembly 12 by the application of pressure to the mixture by use of a block machine or similar machine. The press head plate 28 having various plunger assemblies, such as the multilevel plunger assemblies 30, 34, and 38, are used to apply pressure to the mold box assembly 12. As previously described, the multilevel plunger assemblies include press head plates and press plates. The press plates of the multilevel plunger assemblies may have a pattern, such as a stone pattern, to add character to the visible surfaces of the blocks 330, 400, and 450. By way of example only, the elevated top portion 336 and the lower top portion 338 of the block 330 are visible surfaces which may have a pattern formed therein. For example, the press plate may have a cobblestone pattern that may be transferred to the visible surfaces 336 and 338 of the block 330. Also, the press plate may be heated to facilitate release of the press plate from the blocks 330, 400, and 450. Once the blocks 330, 400, and 450 are formed they may be cured through any method known in the art. For example, curing may take the form of air curing for a number of days or steam curing, but normally one day is allowed or needed for adequate cure.

Many combinations of concrete mixtures may be employed in manufacturing the blocks 330, 400, and 450. Some considerations in determining the particular concrete mixtures include compression strength requirements, density, and adsorption. Further, the costs of the materials, such as sand, gravel, cement, pigment additives, and rock have an impact on the mixture to be used. For example, gravel may be cheaper than river rock in some areas of the country and the blocks 330, 400, and 450 may be formed of a mixture having more gravel than rock due to the difference in cost. The blocks 330, 400, and 450 may be constructed with colored pigments to form different colored blocks. In particular and by way of example only, the block 330 may be formed from one color, the block 400 may be constructed of a second or different color, and the block 450 may be constructed of a third color. In this manner the blocks 330, 400, and 450 may have contrasting colors that add to texture, appearance, or detail to any landscaping project or structure. It should be recognized that the blocks 330, 400, and 450 of the present disclosure may be constructed of various materials that are available. Preferably, the blocks 330, 400, and 450 will be of relatively lightweight so that the blocks 330, 400, and 450 can be easily manufactured, stored, transported, and installed. Also, any multilevel block formed by the mold system 10 may be of any size or configuration by use of a suitable sized and configured mold box and plunger assembly.

Figure 21:
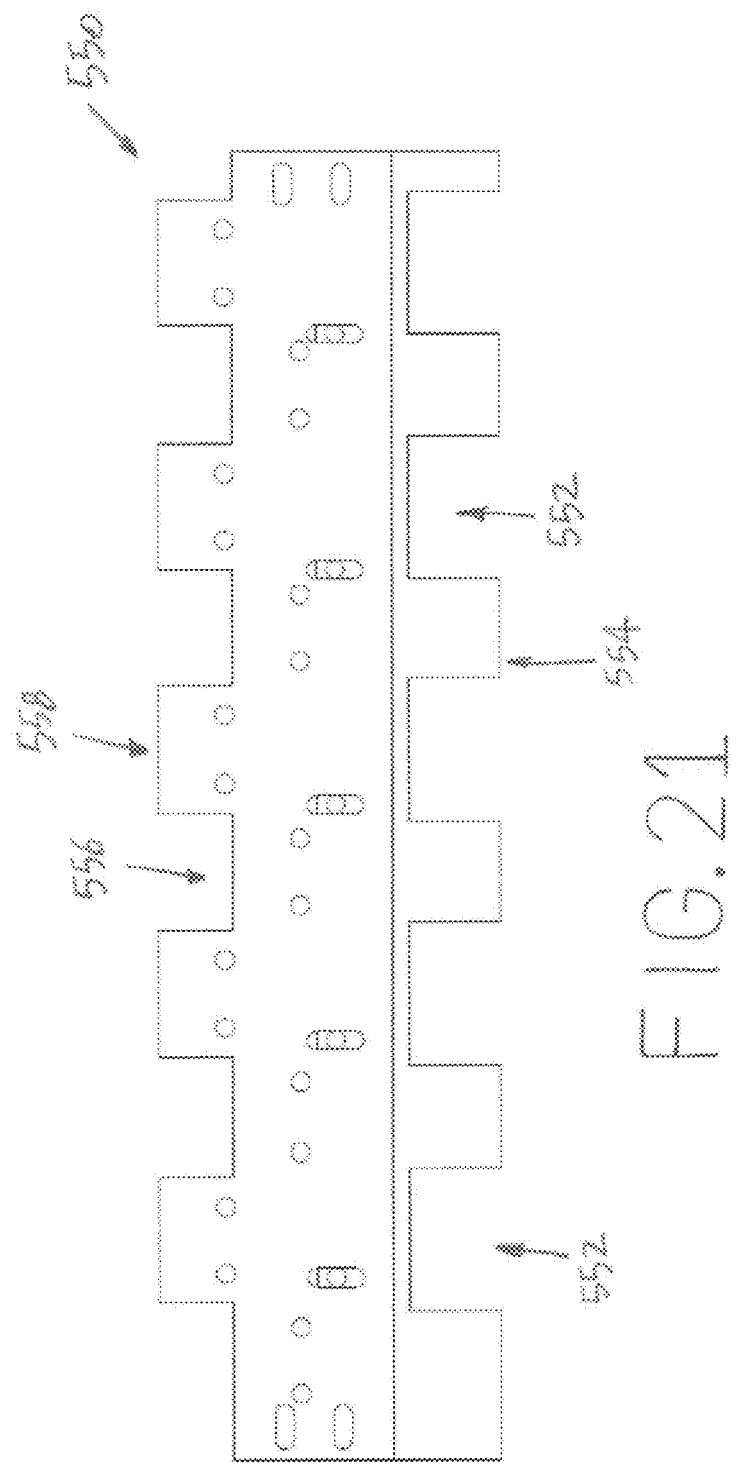
FIG. 21 is a front view of a screed plate used to manufacture blocks of the present mold system for forming multilevel blocks.

FIG. 21 illustrates a screed or strike-off plate 550 which is configured to remove any excess concrete mixture which is used to form the blocks 330, 400, or 450. The plate 550 has cut out areas 552 along a lower end 554 which allow the plate 550 to move over each elevated portion, such as the upper edge 64 of the mold box insert 16, of the mold box assembly 12. In this manner, excess concrete mixture is removed from both the elevated top portion 336 and the lower top portion 338 when forming the block 330 in the mold box assembly 12. The plate 550 also has cut out areas 556 along an upper end 558. Brushes (not shown) may be placed along the cut out areas 556 and the upper end 558 to brush off any excess mixture and to clean off the press plates. It is also possible that different shaped screed plates 550 may be required or may be used. For example, if the mold box inserts 16 are orientated in the mold box assembly 12 back to back, then theft a different screed plate 550 will have to be used in which the different screed plate 550 will have wider openings or cut out areas 552 and 556 and wider brushes.

Figure 22:
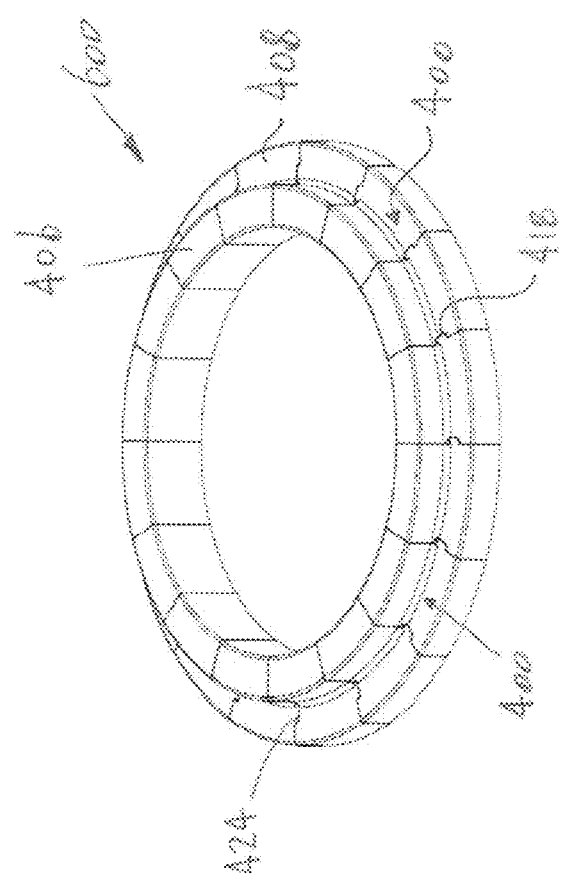
FIG. 22 is a perspective view of a tree ring being formed by use of numerous tree ring blocks constructed according to the present mold system for forming multilevel blocks.

FIG. 22 shows a tree ring 600 that may be constructed using the tree ring blocks 400 that can be used to form a border around a tree (not shown). In particular, since each of the blocks 400 has a 22.5° radius sixteen of the blocks 400 are required to form a complete circular border. The blocks 400 are connected together by use of the groove portion 418 and the tongue portion 424. Each of the blocks 400 has the elevated top portion 406 and the lower top portion 408. The lower top portion 408 presents a platform or surface upon which wheels of lawn cutting equipment may ride or travel upon when cutting grass. As can be appreciated, grass that grows along or adjacent to the blocks 400 is cut to the same height as grass that grows in the lawn. The blocks 400 also keep or hold in any mulch, dirt, or rocks inside the tree ring 600. Further, other blocks, such as the blocks 330 and 450 may be used to construct a border having any configuration around a tree, a planting bed, or area.

Figure 23:
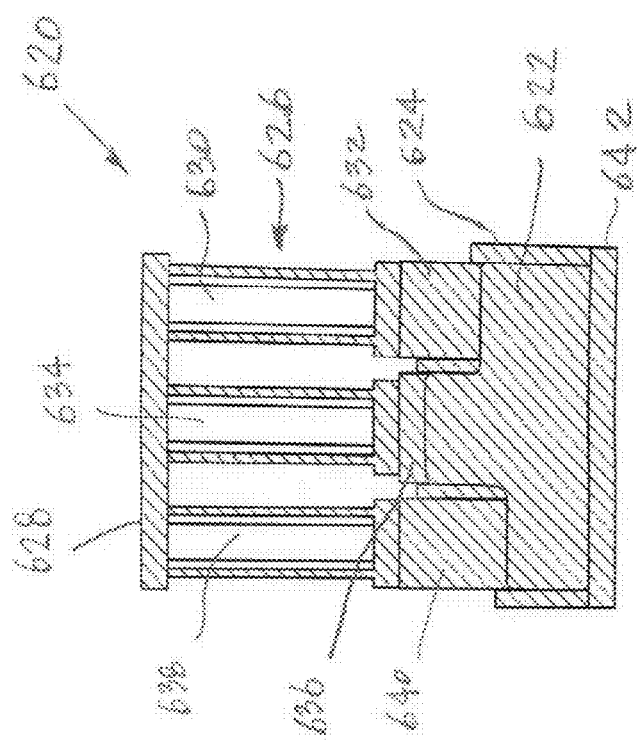
FIG. 23 is a cross-sectional view of another embodiment of the mold system of the present disclosure forming a multilevel block.

Referring now to FIG. 23, another embodiment of a mold system 620 for forming a three tiered multilevel block 622 is shown. The mold system 620 comprises a mold box insert 624 that is adapted to be placed in a mold box frame (not shown), a plunger assembly 626, and a press head plate 628. The plunger assembly 626 includes a first tube 630 having a first press plate 632, a second tube 634 having a second press plate 636, and a third tube 638 having a third press plate 640. In this particular embodiment the tubes 630, 634, and 638 have been welded to the press head plate 628. However, it is also possible that the tubes 630, 634, and 638 may be connected to a top mounting plate which is mounted to the press head plate 628. The block 622 is shown being positioned on a production board 642. The block 622 is being compressed in this particular position.

Figure 24:
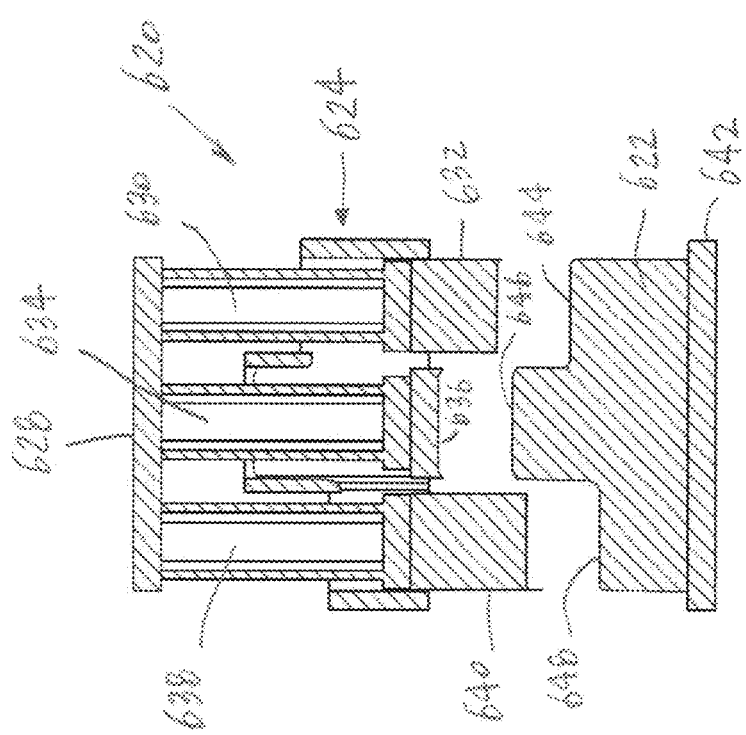
FIG. 24 is a cross-sectional view of the mold system of FIG. 23 in which the mold system has been stripped away from the multilevel block.

FIG. 24 shows the mold system 620 being completely stripped away from the block 622 during the manufacturing process. The block 622 is left positioned on the production board 642 to be further processed. The block 622 has a first tier 644, a second tier 646, and a third tier 648. By use of the mold system 620, the multilevel block 622 may be manufactured.

As can be appreciated, the blocks 330, 400, and 450 of the present disclosure may be used for both commercial and residential use in building various borders for a landscaped area. Numerous other designs or shapes for various borders for a landscaped area may be formed by using the blocks 330, 400, and 450. Further, instructions for a particular border may be provided with the blocks 330, 400, and 450 to assist in installation of the particular border. By using the instructions, an individual or homeowner will be able to construct a border quickly and easily, including square corners and other shapes.

Other advantages associated with the use of the mold system 10 include the reduced number of different components or parts that need to be manufactured, transported, stored, or inventoried. Since only one mold box needs to be constructed to manufacture the blocks 330, 400, and 450 to construct a border, manufacturing costs are significantly reduced. In particular, only having one mold box can reduce manufacturing costs. Further, with use of the blocks 330, 400, and 450 nearly all shapes and patterns can be installed. The blocks 330, 400, and 450 are also easy to install and various different shaped borders are capable of being constructed or installed. Other examples of borders that may be constructed using the blocks 330, 400, and 450 of the present disclosure include borders around paths, sidewalks, floors, patios, steps, streets, and driveways, as well as a paver edging system. The mold system 10 is flexible in that different number of blocks may be manufactured depending upon purchase orders or inventory requirements. For example, if more straight blocks 330 need to be manufactured then five mold box inserts 16 may be placed on the mold box frame 14 and five plunger assemblies 30 may be placed on the press head plate 28. In this particular arrangement, ten of the blocks 330 will be manufactured at a time. It is also contemplated that a dedicated mold frame 14 having five mold box inserts 16 that are bolted or secured to the mold box frame 14 may be used. The mold system 10 allows for any combination of the blocks 330, 400, or 450 to be manufactured at a time. Further, if it is determined that the blocks 400 are very popular then a dedicated press head plate 28 having plunger assemblies 34 welded thereto may be used to continuously manufacture the blocks 400.

From all that has been said, it will be clear that there has thus been shown and described herein a mold system for forming multilevel blocks which fulfills the various advantages sought therefore. It will become apparent to those skilled in the art, however, that many changes, modifications, variations, and other uses and applications of the subject mold system for forming multilevel blocks are possible and contemplated. All changes, modifications, variations, and other uses and applications which do not depart from the spirit and scope of the disclosure are deemed to be covered by the disclosure, which is limited only by the claims which follow.

What is claimed is:

1. A mold system for forming a multilevel block comprising:
    a first multilevel mold box insert for forming a first multilevel block, the first multilevel mold box insert having a bottom;
    a mold box frame adapted for receiving therein the first multilevel mold box insert;
    a first multilevel plunger assembly comprising a top mounting plate, a first front tube connected to the top mounting plate and a first front mounting plate connected to the first front tube, and a first front press plate connected to the first front mounting plate, the first front press plate having a thickness and a top, a first rear tube connected to the top mounting plate and a first rear mounting plate connected to the first rear tube, and a first rear press plate connected to the first rear mounting plate, the first rear press plate having a thickness, the thickness of the first front press plate being greater than the thickness of the first rear press plate, the differences in the thicknesses of the first front press plate and the first rear press plate for allowing the first front press plate and the first rear press plate to be removed away from the first multilevel block when forming the first multilevel block without removing any material from the formed first multilevel block and the top of the first front press plate not moving below the bottom of the first multilevel mold box insert for releasing the plunger assembly from the first multilevel block; and
    a press head plate adapted for receiving thereon the first multilevel plunger assembly.

2. The mold system for forming a multilevel block of claim 1 wherein the multilevel mold box insert comprises a back panel, a right side panel, a central panel, a left side panel, a front panel, and an upper central panel.

3. The mold system for forming a multilevel block of claim 1 wherein the first multilevel block is a straight block.

4. The mold system for forming a multilevel block of claim 1 wherein the first multilevel block is an outside radius block.

5. The mold system for forming a multilevel block of claim 1 wherein the first multilevel block is an inside radius block.

6. The mold system for forming a multilevel block of claim 1 wherein the first front press plate is configured to form a straight block.

7. The mold system for forming a multilevel block of claim 1 wherein the multilevel mold box insert comprises a back panel, a right side panel, a first central panel, a second central panel, a left side panel, a front panel, and an upper central panel.

8. The mold system for forming a multilevel block of claim 1 further comprising a second multilevel plunger assembly comprising a top mounting plate, a first front tube connected to the top mounting plate and a first front mounting plate connected to the first front tube, and a first front press plate connected to the first front mounting plate, a second front tube connected to the top mounting plate and a second front mounting plate connected to the second front tube, and a second front press plate connected to the second front mounting plate, a first rear tube connected to the top mounting plate and a first rear mounting plate connected to the first rear tube, and a first rear press plate connected to the first rear mounting plate, and a second rear tube connected to the top mounting plate and a second rear mounting plate connected to the second rear tube, and a second rear press plate connected to the second rear mounting plate, the first front tube, the second front tube, the first rear tube, and the second rear tube each having a length and all of the lengths being the same, and the press head plate adapted for receiving thereon the second multilevel plunger assembly.

* * * * *